(12) United States Patent
Payne et al.

(10) Patent No.: US 7,614,209 B1
(45) Date of Patent: Nov. 10, 2009

(54) MECHANICALLY RELEASABLE SHACKLE PIN

(75) Inventors: Jack Darryl Payne, Spring, TX (US); Tait James Landry, Thibodaux, LA (US); James L. Goljenboom, Kenner, LA (US); Richard Joseph Ordoyne, Ocean Springs, MS (US); Timothy A. Dunbar, Houma, LA (US)

(73) Assignee: J. Ray McDermott, S.A., Houston, TX (US)

( * ) Notice: Subject to any disclaimer, the term of this patent is extended or adjusted under 35 U.S.C. 154(b) by 0 days.

(21) Appl. No.: 12/198,398

(22) Filed: Aug. 26, 2008

(51) Int. Cl.
*B66C 1/34* (2006.01)
*F16G 15/06* (2006.01)

(52) U.S. Cl. .................. 59/86; 403/324; 294/82.1; 294/82.35

(58) Field of Classification Search .......... 59/84–86; 294/82.1, 82.35; 403/154, 317, 324
See application file for complete search history.

(56) References Cited

U.S. PATENT DOCUMENTS

| | | | | |
|---|---|---|---|---|
| 620,914 A | * | 3/1899 | Griffith | 59/86 |
| 962,733 A | * | 6/1910 | Beltz | 59/86 |
| 2,097,465 A | * | 11/1937 | Morrison | 59/86 |
| 2,435,336 A | * | 2/1948 | Belvel | 59/86 |
| 4,221,252 A | * | 9/1980 | Bruce | 59/86 |
| 4,307,567 A | * | 12/1981 | Archer | 59/86 |
| 5,046,881 A | * | 9/1991 | Swager | 59/86 |
| 7,393,033 B1 | * | 7/2008 | Bisso, IV | 59/86 |
| 7,540,140 B1 | * | 6/2009 | Diaz et al. | 59/86 |

* cited by examiner

*Primary Examiner*—David B Jones
(74) *Attorney, Agent, or Firm*—D. Neil LaHaye; Eric Marich

(57) ABSTRACT

A mechanically releasable shackle pin arrangement that is readily operated by an ROV and is not affected by the hydrostatic pressures encountered at depth. A shackle body having two ends has a shackle pin received through bores at one end of the shackle body. A shackle nut threaded on the shackle pin secures the shackle pin in an installed position through the bores in the shackle body. An anti-rotation link plate is attached to the shackle body. The anti-rotation link plate extends to one end of the side plate. The shackle pin extends through bores at one end of the shackle body and the anti-rotation link plate and is secured in its installed position by a shackle nut threaded on the shackle pin. Means for preventing rotation of the shackle nut and loss of the shackle nut is provided on the anti-rotation link plate such that the shackle pin can be removed by a remotely operated tool on an ROV at depth to release a load without the need for hydraulics on the shackle assembly. The shackle pin is provided with a special plate arrangement designed to allow the shackle pin to be gripped and rotated by a remotely operated tool on an ROV.

7 Claims, 6 Drawing Sheets

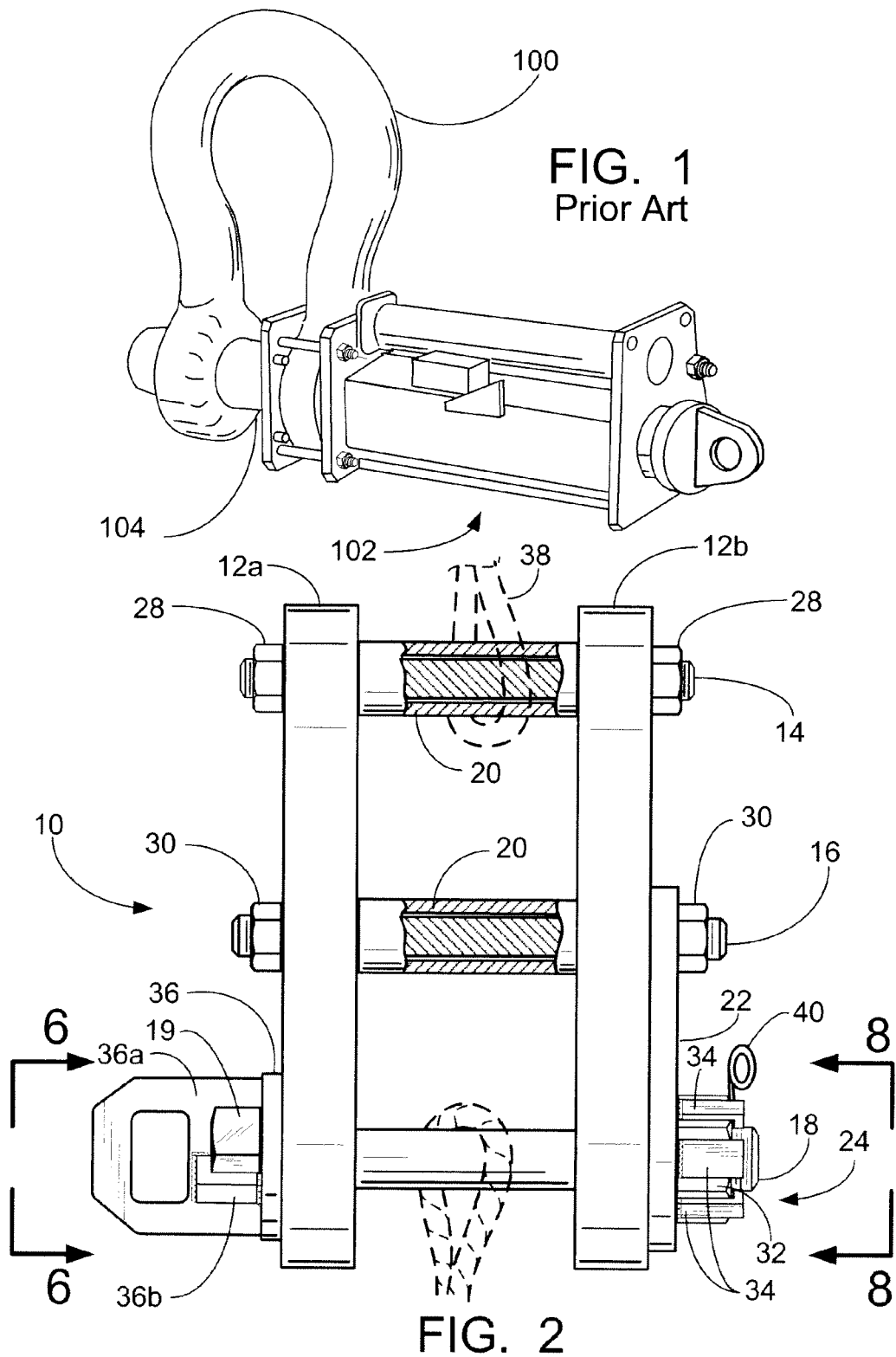

MECHANICALLY RELEASABLE SHACKLE PIN

FIELD AND BACKGROUND OF INVENTION

The invention is generally related to the use of shackles used to lift and lower equipment and more particularly to a means of releasing the equipment from the shackles.

In the offshore oil and gas industry, it is routinely necessary to lower equipment to the sea floor or to specific levels of structures underwater. Because of the water depths involved, as deep as 5,000 feet or deeper, it is often unsafe and impractical to use divers. At these depths, use of an ROV (Remotely Operated Vehicle) is preferred for underwater operations.

In the past it has been common to use a hydraulic shackle pin release mechanism that enabled shackles to be removed from equipment underwater without substantial outside assistance. The hydraulic release mechanism can be remotely activated by an ROV, thus allowing surface vessels to lower equipment and disengage the attached rigging without the support of divers.

As seen in the prior art drawing of FIG. 1, the hydraulic release shackle link pin is a link pin arrangement that has one side of the link plate connected to a padeye and the other side connected to a sling. This serves the purpose of having a hydraulic pin transfer force from the slings to the padeye. After transfer of load is complete, the hydraulic pins can be activated to release the load and recover the rigging to the surface. These hydraulic plates are operated by ROV's and are suitable for deep water environments. A major downside of the hydraulic link plates is the potential for failure if the device is not hydraulically primed correctly prior to installation. Because of the extreme water pressures at depth, incorrect hydraulic priming has the potential for the pin to succumb to hydrostatic load, thereby retracting the pin back from the padeye and providing the potential for a full release of the load prior to the desired time. As an example, the hydrostatic pressure at 5,000 feet in seawater is approximately 2,222 pounds per square inch. Such a premature full or even partial release of the load can result in damage to or complete loss of the equipment.

Another issue with the hydraulic release mechanism is the potential for leakage which could pose an environmental hazard.

SUMMARY OF INVENTION

The present invention addresses the shortcomings of the art and eliminates the need for a hydraulic release mechanism. What is provided is a mechanically releasable shackle pin and shackle arrangement that is readily operated by an ROV and is not affected by the hydrostatic pressures encountered at depth. A shackle body having two ends has a shackle pin received through bores at one end of the shackle body. A shackle nut threaded on the shackle pin secures the shackle pin in an installed position through the bores in the shackle body. An anti-rotation link plate is attached to the shackle body. The anti-rotation link plate extends to one end of the side plate. The shackle pin extends through bores at one end of the shackle body and the anti-rotation link plate and is secured in its installed position by a shackle nut threaded on the shackle pin. Means for preventing rotation of the shackle nut and loss of the shackle nut is provided on the anti-rotation link plate such that the shackle pin can be removed by a remotely operated tool on an ROV at depth to release a load without the need for hydraulics on the shackle assembly. The shackle pin is provided with a special plate arrangement designed to allow the shackle pin to be gripped and rotated by a remotely operated tool on an ROV.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same:

FIG. 1 illustrates a prior art hydraulic release mechanism.

FIG. 2 is a plan view of one embodiment of the invention.

DESCRIPTION OF THE PREFERRED EMBODIMENTS

FIG. 1 illustrates a prior art hydraulic release mechanism. A shackle 100 has a hydraulic cylinder 102 attached thereto. The ram 104 of the hydraulic cylinder 102 extends through the bores in the shackle and acts as the release pin for supporting, lowering, and releasing a load.

Figure 8:
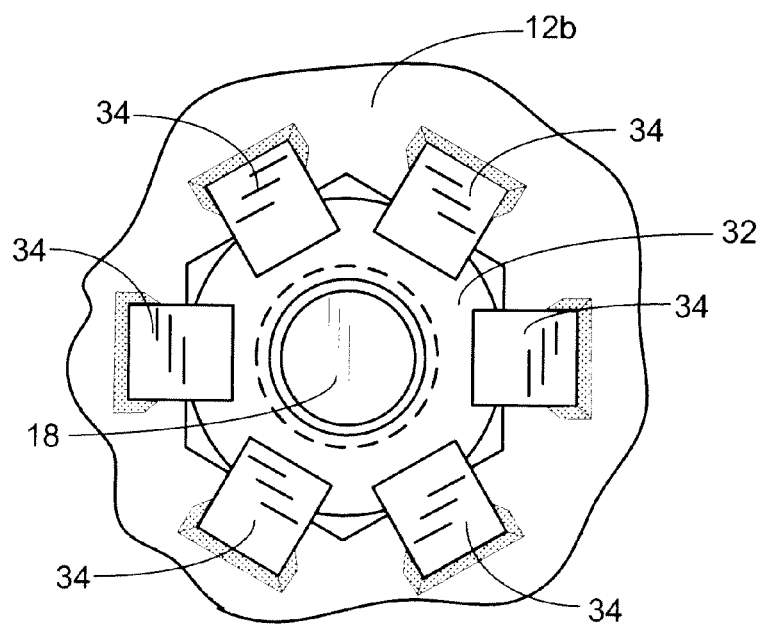
FIG. 8 is a detail view that illustrates the means for capturing and preventing rotation of the shackle nut.
Figure 9:
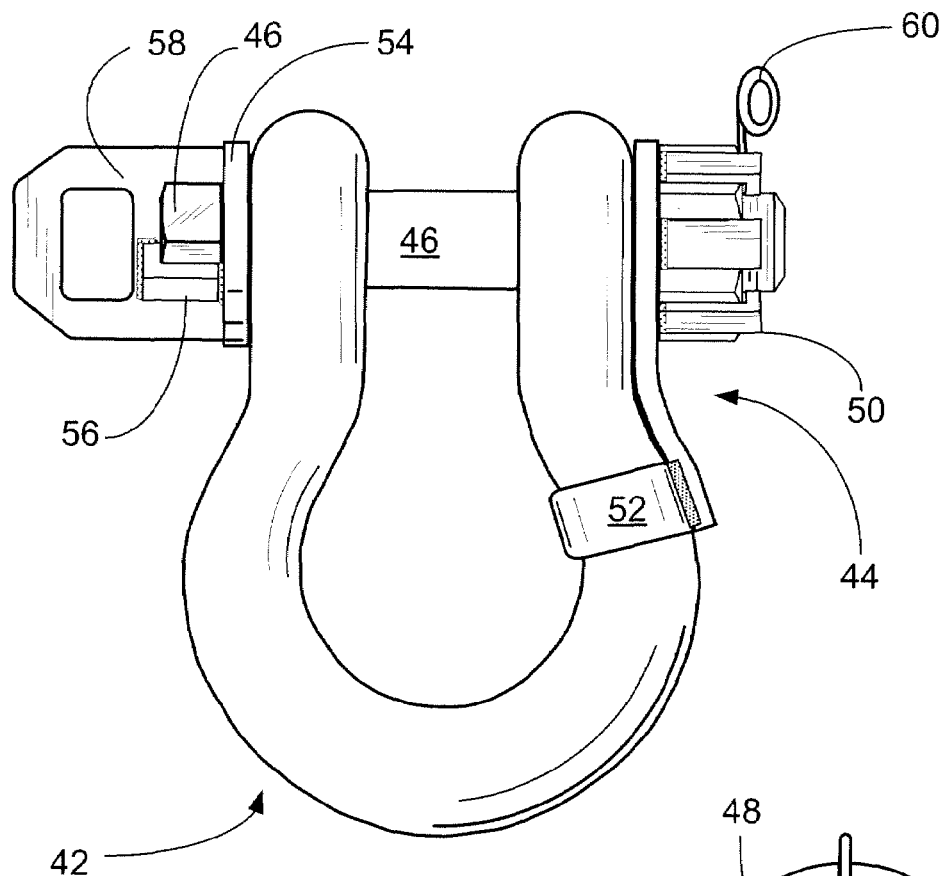
FIG. 9 is a plan view of another embodiment of the invention.
Figure 10:
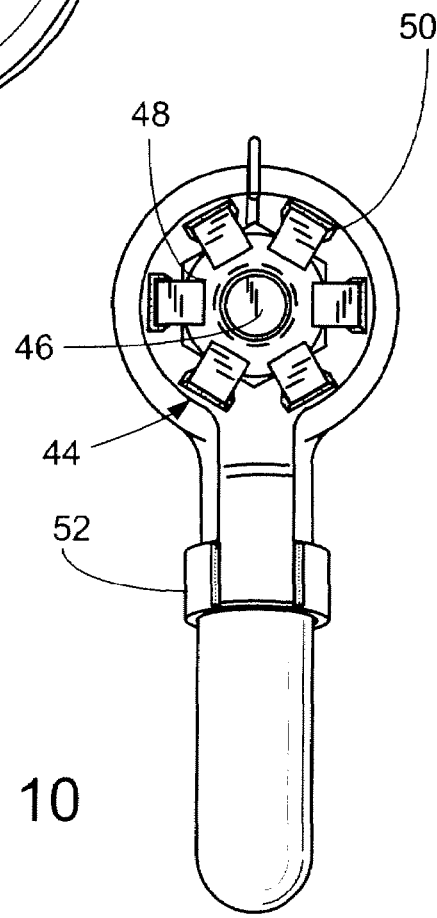
FIG. 10 is a side view of the embodiment of FIG. 9.

The invention is generally directed to a shackle arrangement that provides for the mechanical gripping, rotation, and removal of a shackle pin from a shackle arrangement, means for capturing the shackle nut to prevent loss, and means for preventing rotation of the shackle nut during rotation of the shackle pin. The invention may be practiced with the different embodiments illustrated in FIGS. 2-8 of a specially constructed arrangement or as illustrated in FIGS. 9-10 by the modification of a pre-existing shackle arrangement. Both embodiments are described below.

Figure 3:
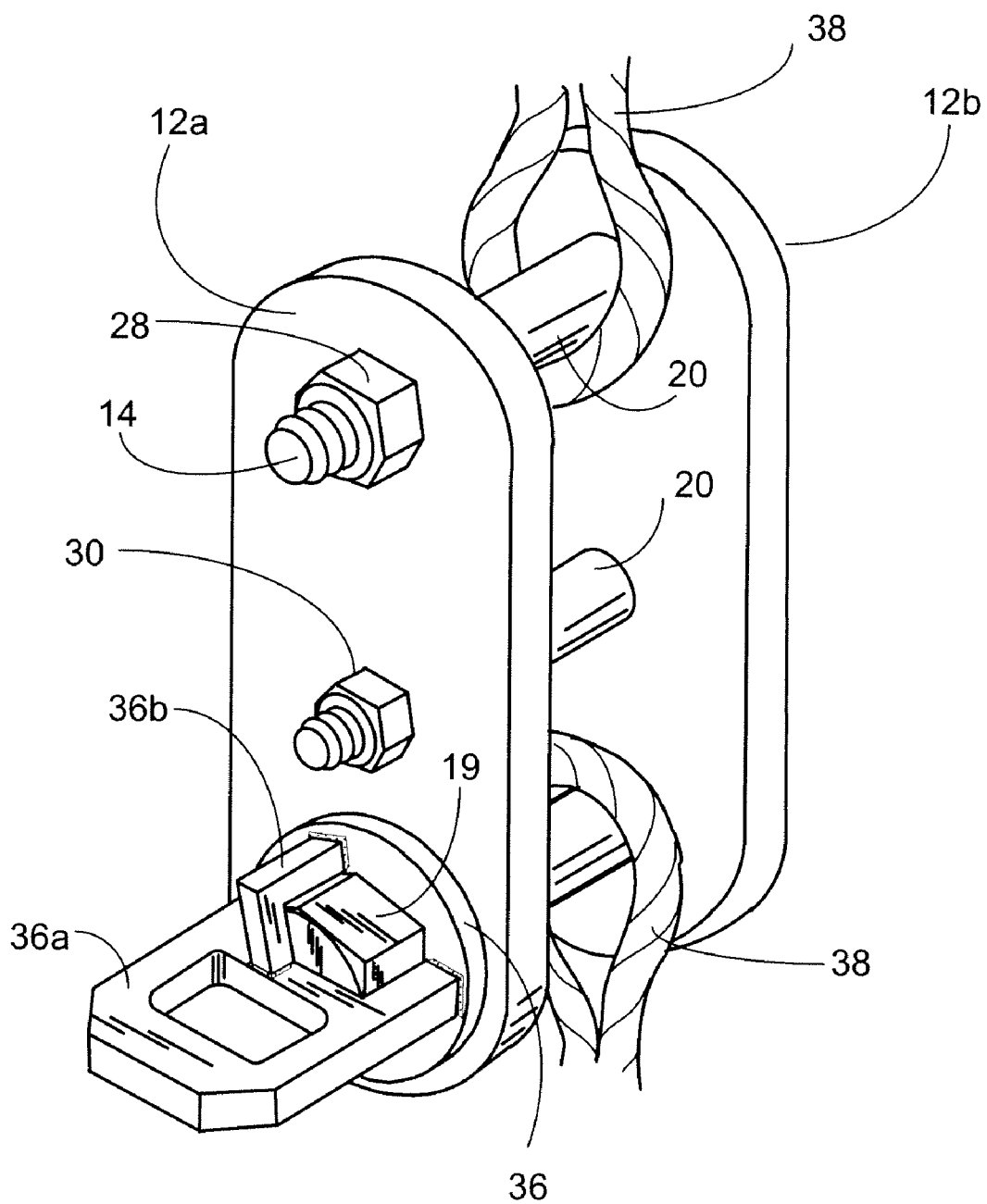
FIG. 3 is a side perspective view that illustrates the special head of the shackle nut.
Figure 4:
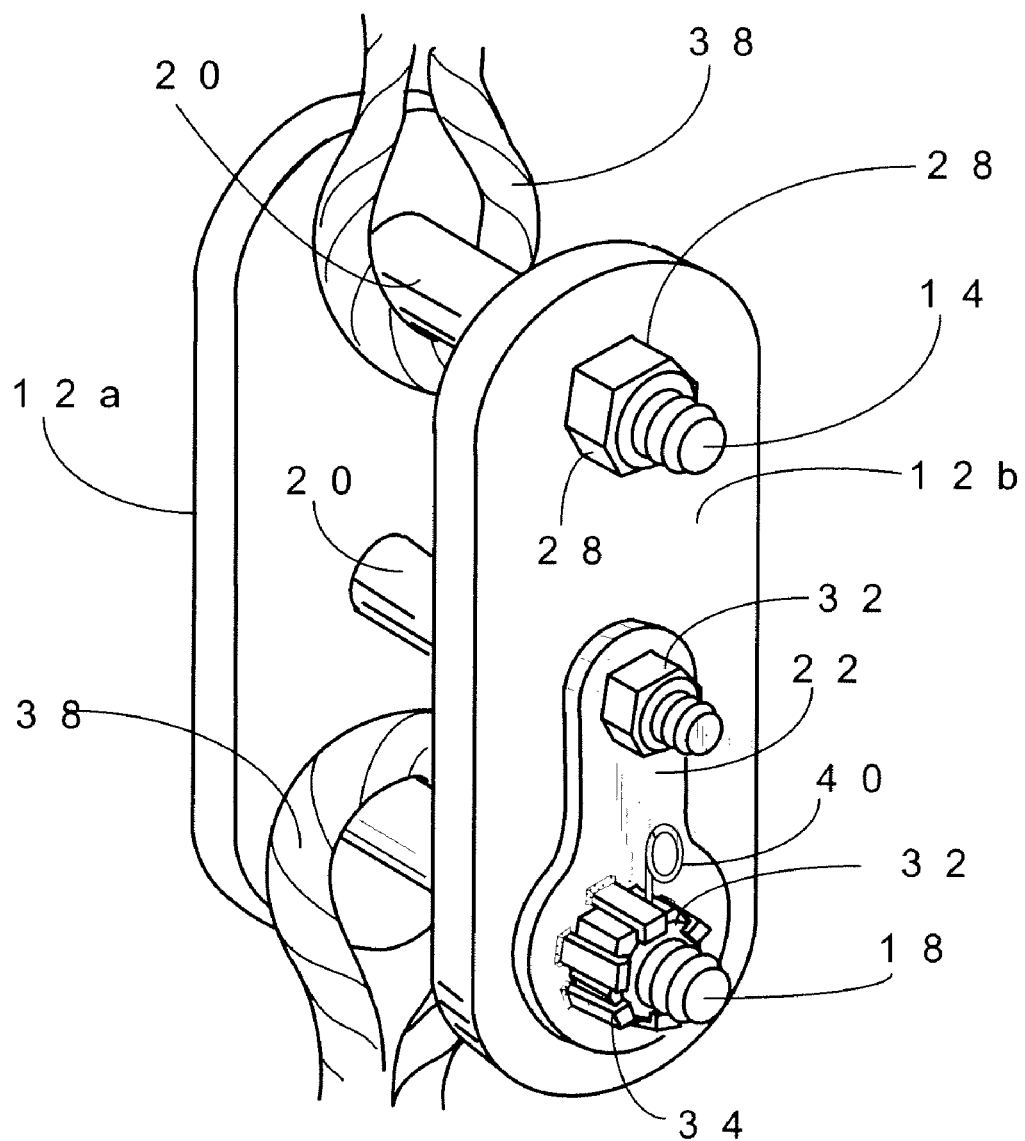
FIG. 4 is a side perspective view that illustrates the anti-rotation plate and means for capturing and preventing rotation of the shackle nut.
Figure 5:
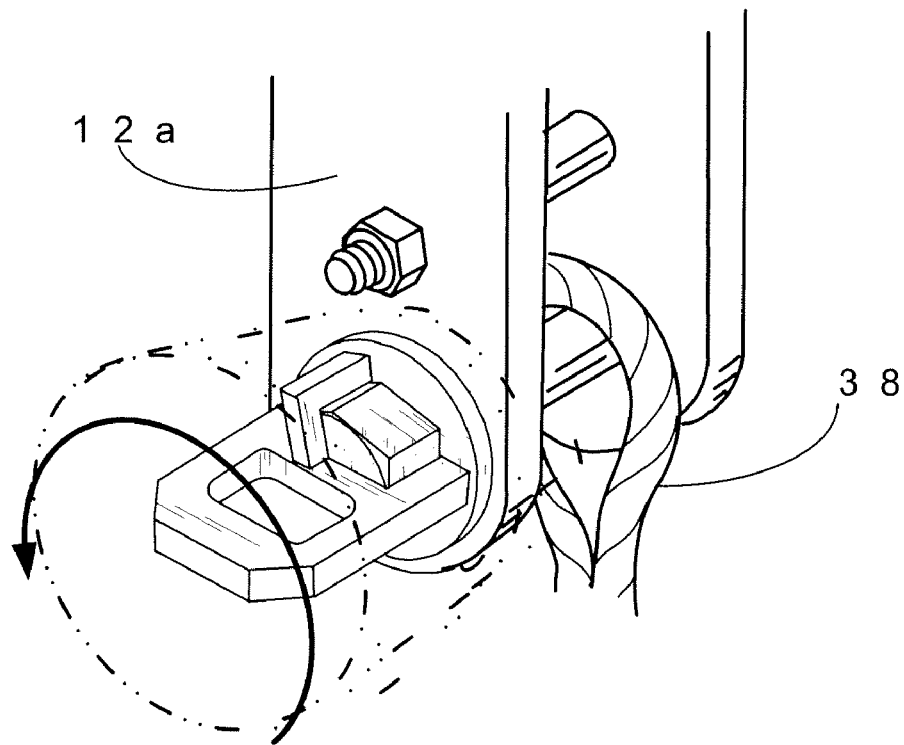
FIG. 5 illustrates the rotation of the shackle pin during operation.
Figure 6:
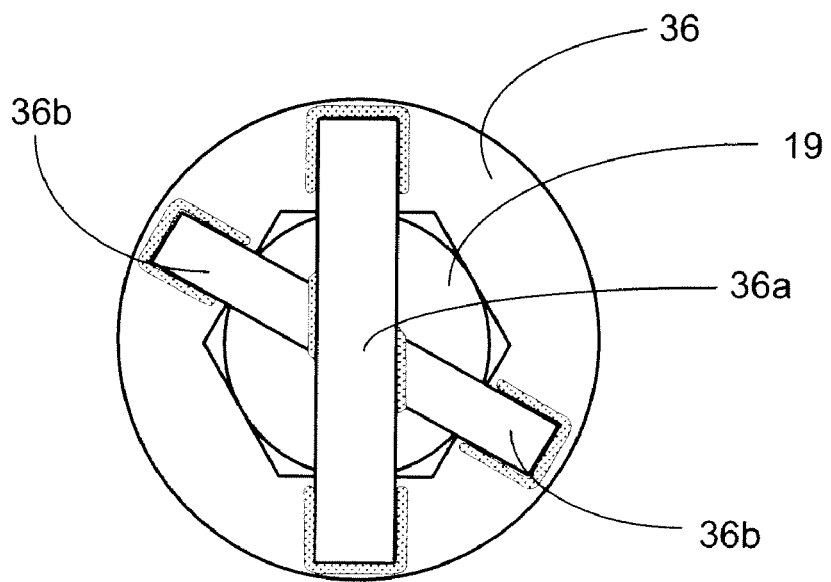
FIG. 6 is a detailed view that illustrates the head of the shackle pin.

As seen in the embodiment of FIGS. 2-4, mechanically releasable shackle 10 is generally comprised of two main side plates 12a, b, bolts or studs 14, 16, shackle pin 18, spacers 20, anti-rotation link plate 22, and means 24 for preventing rotation of and retaining the shackle nut 32.

Main side plates 12a, b are spaced apart by spacers 20 placed between the plates 12a, b. Each main side plate 12a, b is provided with bores therethrough sized to receive the bolts or studs 14, 16, and shackle pin 18. Stud 14 is received through the bores in the main side plates 12a, b and its spacer 20 and secured in place with nuts 28.

Stud 16 is received through the bores in the main side plates 12a, b and its spacer 20 and secured in place by nuts 30. It is seen in FIGS. 2 and 4 that the anti-rotation link plate 22 is also provided with a bore to receive the stud 16 and that nut 30 secures the anti-rotation link plate 22 to the outside of main side plate 12b.

While parts 14 and 16 are shown as studs, it should be understood that a bolt may also be used for each of these parts.

The shackle pin 18 is received through the bores in the main side plates 12a, b and the anti-rotation link plate 22. The shackle pin 18 is threaded through shackle nut 32. The shackle pin 18 is preferably provided with a plate or washer 36 engaged with the shackle pin 18 and designed to receive the shackle pin 18 such that the plate or washer 36 is captured between the head 19 of the shackle pin 18 and the side plate 12a. The plate or washer 36 is provided with rigidly attached surfaces 36a, b that capture the head 19 to allow rotation of the shackle pin 18 by an ROV tool and removal of the shackle pin 18 by the ROV tool to release the load. The result is that the certified original shackle pin head is not modified but can be gripped by a suitable tool on an ROV (Remotely Operated Vehicle) for turning the shackle pin 18.

Figure 7:
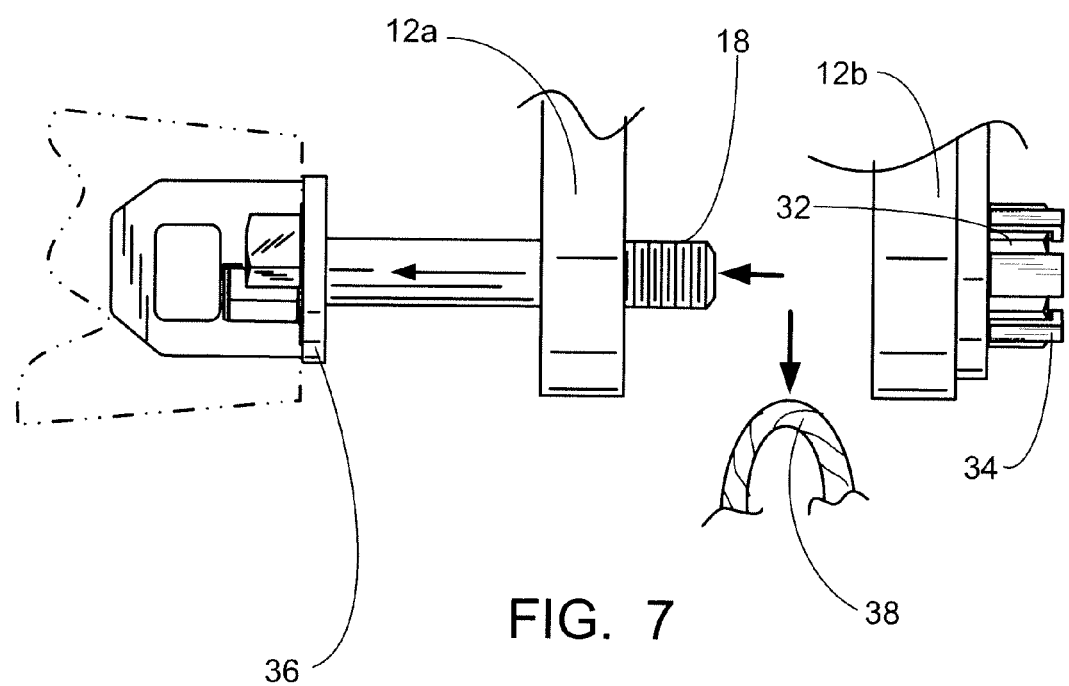
FIG. 7 is a detailed view that illustrates the removal of the shackle pin during operation.

Means 24 for preventing rotation of shackle nut 32 and retaining shackle nut 32 is attached to the anti-rotation link plate 22 and is comprised of a plurality of side walls 34 perpendicular to the anti-rotation link plate 22 that envelope the shackle nut 32 without physically altering the shackle nut 32. As seen in FIGS. 4, 7, and 8, the side walls 34 preferably fold over the end of the shackle nut 32 to prevent loss of the shackle nut 32. As best seen in FIG. 8 and indicated by the shaded sections that indicate welding, the side walls 34 are welded to the anti-rotation link plate 22. This allows the original material and construction certifications of the shackle nut 32 to be retained because the shackle nut 32 is not modified. Side walls 34 are only one example of a means for retaining and preventing rotation of the shackle nut 32. Any other suitable means may also be used to retain the shackle nut 32. As an example, welding the shackle nut 32 to the anti-rotation link plate 22 may be used to retain the shackle nut 32. As another example, the anti-rotation link plate may have a bore that is the same size and shape as the shackle nut 32 so as to receive the shackle nut 32 and capture it against the side plate 12b with the side walls 34. It can be important to retain the original material and construction certifications.

While the anti-rotation link plate 22 is illustrated as being secured to the main plates 12a, b by a stud or bolt and nut, it should be understood that any suitable means of securing the anti-rotation plate 22 in place may be used such as welding or making the anti-rotation link plate 22 integral with the side plate.

In another embodiment of the invention, as indicated above, it is also possible to adapt a pre-existing shackle 42 to perform in the same manner as described above. As seen in FIGS. 9 and 10, an anti-rotation link plate 44, and a shackle pin 46 with a special plate arrangement designed to allow the shackle pin to be gripped and turned by a tool on an ROV are used as described above. The anti-rotation link plate 44 captures the shackle nut 48 using side walls 50 as described above. The anti-rotation link plate 44 is secured to the shackle body to prevent rotation of the plate 44 itself and the shackle nut 48 by having the end opposite the side walls 50 wrapped around the shackle body. The end is secured around the shackle body by any suitable means such as wrapping two arms 52 of the plate 44 around the shackle body and welding the arms closed around the shackle body without welding to the shackle itself. This is preferable so as not to alter the material and construction certifications of the shackle 42. A plate or washer 54 is engaged with the shackle pin 46 and designed to receive the shackle pin 46 such that the plate or washer is captured between the head 56 of the shackle pin 46 and the shackle 42. As described above, the plate or washer is provided with rigidly attached surfaces 58 that capture the head 56 to allow rotation of the shackle pin 46 by an ROV tool and removal of the shackle pin 46 by the ROV tool to release the load. The result is that the certified original shackle pin head is not modified. A locking pin 60 may be used to prevent premature unthreading and release of the shackle pin 46.

In operation, as best seen in FIGS. 3-5 and 7, a sling 38 is placed around one end of the shackle arrangement. A sling 38 for a load to be supported and lowered is held by the shackle pin at the opposite end of the shackle arrangement. A locking pin may be inserted through a bore in the shackle pin to insure that the shackle pin does not prematurely release the load. The load is lifted and lowered into position using the shackle arrangement. A tool on a remotely operated vehicle (ROV) is used to remove the locking pin, grasp the special head on the shackle pin, turn the shackle pin to unthread it from the shackle nut, and then pull the shackle pin from the shackle arrangement to release the load. The shackle pin and shackle arrangement are then fully recovered for reuse on another job. While slings 38 are mentioned and shown it should be understood that padeyes, shackles, or other lifting hardware may be used to suit the application at hand.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A mechanically releasable shackle pin and shackle arrangement, comprising:
   a. a shackle body having two ends;
   b. a shackle pin received through bores at one end of the shackle body;
   c. means for securing the shackle pin in an installed position through the bores in the shackle body, comprising a shackle nut threaded on the shackle pin;
   d. means for preventing rotation of the shackle nut, comprising:
      i. an anti-rotation link plate attached to the shackle body with one end of the plate having a bore that receives the shackle pin; and
      ii. side walls on the anti-rotation link plate that capture the shackle nut; and
   e. means for allowing mechanical removal of the shackle pin from its installed position.

2. The mechanically releasable shackle pin and shackle arrangement of claim 1, wherein the means for allowing mechanical removal of the shackle pin from its installed position comprises a plate engaged with the shackle pin capable of being gripped and rotated by a remotely operated tool.

3. A mechanically releasable shackle pin and shackle arrangement, comprising:
   a. two main side plates spaced apart from each other;
   b. a shackle pin received through bores at one end of the side plates;
   c. means for securing the shackle pin in an installed position through the bores in the side plates, comprising a shackle nut threaded on the shackle pin;
   d. means for preventing rotation of the shackle nut, comprising:
      i. an anti-rotation link plate attached to one of the main side plates with one end of the plate having a bore that receives the shackle pin; and ii. side walls on the anti-rotation link plate that capture the shackle nut; and e. means for allowing mechanical removal of the shackle pin from its installed position.

4. The mechanically releasable shackle pin and shackle arrangement of claim 3, wherein the means for allowing mechanical removal of the shackle pin from its installed position comprises a plate engaged with the shackle pin capable of being gripped and rotated by a remotely operated tool.

5. A mechanically releasable shackle pin and shackle arrangement, comprising:
   a. two main side plates spaced apart from each other;
   b. an anti-rotation link plate attached to one of the main side plates with one end of the plate having a bore that receives the shackle pin;
   c. a shackle pin in an installed position received through bores at one end of the side plates and through the bore in the anti-rotation link plate;
   d. a shackle nut threaded on the shackle pin for securing the shackle pin in the installed position through the side plates and anti-rotation link plate;
   e. means on the anti-rotation link plate for capturing and preventing rotation of the shackle nut; and
   f. means for allowing mechanical removal of the shackle pin from its installed position.

6. The mechanically releasable shackle pin and shackle arrangement of claim 5, wherein the means for capturing and preventing rotation of the shackle nut comprises side walls on said anti-rotation link plate that capture the shackle nut.

7. The mechanically releasable shackle pin and shackle arrangement of claim 5, wherein the means for allowing mechanical removal of the shackle pin from its installed position comprises a plate engaged with the shackle pin capable of being gripped and rotated by a remotely operated tool.

* * * * *